(12) United States Patent
Hasenfang et al.

(10) Patent No.: US 8,515,386 B2
(45) Date of Patent: *Aug. 20, 2013

(54) EMERGENCY SERVICES FOR VOICE OVER IP TELEPHONY (E-VOIP)

(76) Inventors: Dennis J. Hasenfang, Waterford, WI (US); Christopher C. Willis, Naperville, IL (US)

( * ) Notice: Subject to any disclaimer, the term of this patent is extended or adjusted under 35 U.S.C. 154(b) by 18 days.

This patent is subject to a terminal disclaimer.

(21) Appl. No.: 13/066,837

(22) Filed: Apr. 25, 2011

(65) Prior Publication Data

US 2011/0263219 A1    Oct. 27, 2011

Related U.S. Application Data

(63) Continuation-in-part of application No. 11/500,135, filed on Aug. 7, 2006, now Pat. No. 7,933,580.

(60) Provisional application No. 60/706,088, filed on Aug. 5, 2005.

(51) Int. Cl.
*H04M 11/04*    (2006.01)

(52) U.S. Cl.
USPC ............... 455/404.2; 455/404.1; 455/456.1; 370/352; 379/45

(58) Field of Classification Search
USPC  455/404.1–404.2, 456.1–457; 370/351–356; 379/45
See application file for complete search history.

(56) References Cited

U.S. PATENT DOCUMENTS

| | | | |
|---|---|---|---|
| 6,678,357 B2 | 1/2004 | Stumer et al. | |
| 6,799,049 B1 * | 9/2004 | Zellner et al. | 455/456.1 |
| 6,831,563 B1 | 12/2004 | Contractor | |
| 6,868,074 B1 | 3/2005 | Hanson | |
| 6,927,727 B2 | 8/2005 | Cleghorn | |
| 6,940,950 B2 | 9/2005 | Dickinson et al. | |
| 7,149,499 B1 | 12/2006 | Oran et al. | |
| 7,194,354 B1 | 3/2007 | Oran et al. | |
| 7,257,387 B2 | 8/2007 | Laliberte | |
| 7,260,186 B2 * | 8/2007 | Zhu et al. | 379/45 |
| 7,260,378 B2 | 8/2007 | Holland et al. | |
| 7,388,490 B2 * | 6/2008 | Freitag et al. | 340/572.1 |
| 7,394,423 B2 * | 7/2008 | Martino | 342/357.55 |
| 7,639,792 B2 | 12/2009 | Qiu et al. | |
| 7,653,374 B2 | 1/2010 | Mehio et al. | |
| 7,697,942 B2 | 4/2010 | Stevens | |
| 7,739,402 B2 | 6/2010 | Roese et al. | |
| 7,756,253 B2 | 7/2010 | Breen et al. | |
| 7,809,381 B2 | 10/2010 | Aborn et al. | |
| 7,848,733 B2 | 12/2010 | Bull et al. | |
| 7,933,580 B2 * | 4/2011 | Hasenfang et al. | 455/404.2 |
| 2002/0101818 A1 | 8/2002 | Teixeira | |
| 2003/0063714 A1 | 4/2003 | Stumer et al. | |
| 2003/0086539 A1 | 5/2003 | McCalmont et al. | |
| 2003/0225893 A1 | 12/2003 | Roese et al. | |
| 2004/0057425 A1 | 3/2004 | Brouwer et al. | |
| 2004/0151283 A1 | 8/2004 | Lazoff | |
| 2004/0203920 A1 | 10/2004 | Yoon | |

(Continued)

*Primary Examiner* — Sharad Rampuria

(74) *Attorney, Agent, or Firm* — Henry C. Query, Jr.

(57) ABSTRACT

A method for determining the physical location of a VoIP phone and transmitting the physical location to an emergency services call center or the like comprises the steps of determining the physical location of the VoIP phone using multiple location detection technologies, placing a call to an emergency services call center using the VoIP phone, and automatically transmitting the physical location of the VoIP phone to the emergency services call center.

27 Claims, 7 Drawing Sheets

(56) References Cited

U.S. PATENT DOCUMENTS

| | | |
|---|---|---|
| 2005/0048948 A1 | 3/2005 | Holland et al. |
| 2005/0063519 A1 | 3/2005 | James |
| 2005/0090225 A1 | 4/2005 | Muehleisen et al. |
| 2005/0105496 A1 | 5/2005 | Ambrosino |
| 2005/0111630 A1 | 5/2005 | Potorny et al. |
| 2005/0135569 A1 | 6/2005 | Dickinson et al. |
| 2005/0153681 A1 | 7/2005 | Hanson |
| 2005/0174991 A1 | 8/2005 | Keagy |
| 2005/0190892 A1 | 9/2005 | Dawson et al. |
| 2005/0243973 A1 | 11/2005 | Laliberte |
| 2006/0106930 A1 | 5/2006 | Shaffer |
| 2006/0193447 A1 | 8/2006 | Schwartz |
| 2006/0274729 A1 | 12/2006 | Self |
| 2006/0293024 A1 * | 12/2006 | Benco et al. ............... 455/404.2 |
| 2007/0032225 A1 | 2/2007 | Konicek et al. |
| 2007/0060097 A1 * | 3/2007 | Edge et al. ................. 455/404.1 |
| 2007/0211692 A1 * | 9/2007 | Boroski et al. ................. 370/351 |
| 2008/0160953 A1 | 7/2008 | Mia et al. |
| 2009/0271101 A1 * | 10/2009 | Relyea et al. ................. 701/118 |
| 2010/0184401 A1 | 7/2010 | Spence |
| 2010/0311385 A1 | 12/2010 | Hurwitz |

* cited by examiner

EMERGENCY SERVICES FOR VOICE OVER IP TELEPHONY (E-VOIP)

This application is a continuation-in-part of U.S. patent application Ser. No. 11/500,135 filed on Aug. 7, 2006, which is based on and claims priority from U.S. Provisional Patent Application No. 60/706,088 filed on Aug. 5, 2005.

BACKGROUND OF THE INVENTION

The present invention relates to voice over internet protocol ("VoIP") telephony systems. More particularly, the invention relates to a system for providing emergency services to users of VoIP phones.

The implementation of emergency services for users of the Plain Old Telephone System ("POTS") is fairly straightforward. Each telephone in the POTS is identified with a single user and address. Thus, when a user dials 9-1-1, or any applicable emergency number, the user's name and address are automatically transmitted to the Emergency Services 911 Call Center and the 911 operator can dispatch the proper authorities to this address.

In contrast, the implementation of Emergency services in VoIP telephony systems is not as reliable. A VoIP phone can be used in practically any location which offers internet access. Therefore, the VoIP phone may be used not only from a user's home or office, but also from any of the user's travel destinations.

One system for providing Emergency services to users of VoIP phones requires the provider of the VoIP service to maintain a database of the names and addresses of its users. Thus, when a user dials 9-1-1, his name and address will be transmitted to the Emergency Services 911 Call Center. However, if the user is using the VoIP phone from other than this address, his current location will not be transmitted to the Emergency Services 911 Call Center. In this event, the 911 operator will not be able to determine the user's location unless the user is able to communicate this information verbally. Moreover, if the user cannot communicate his location to the 911 operator, the operator may dispatch the authorities to the address stored in the database, which will obviously not help the user.

SUMMARY OF THE INVENTION

In accordance an embodiment of the present invention, these limitations are overcome by providing an emergency services location detection system which comprises Global Positioning System ("GPS") or cellular technology to determine the current location of the VoIP phone. Thus, when a user dials 9-1-1, or any applicable emergency number, the emergency services location detection system will determine the current location of the VoIP phone and send this information to the Emergency Services 911 Call Center to allow the 911 operator to properly identify the location from where the call has been placed.

The emergency services location detection system of the present invention may be integrated into the VoIP phone or constructed as a separate device which can be connected to a conventional VoIP phone. In addition, the emergency services location detection system may comprise cellular technology, such as Global System for Mobile Communications ("GSM"), General Packet Radio Service ("GPRS") or (Code Division Multiple Access ("CDMA"), to allow the VoIP phone to access the Emergency Services 911 Call Center in the event the VoIP service is unavailable.

These and other objects and advantages of the present invention will be made apparent from the following detailed description, with reference to the accompanying drawings.

DETAILED DESCRIPTION OF THE INVENTION

The present invention is directed to a system for providing emergency services to users of VoIP phones or other types of VoIP telephony devices (the "E-VoIP system"). In accordance with a first embodiment of the invention, the E-VoIP system employs GPS or cellular technology to determine the physical coordinates of the VoIP phone. When a caller uses the VoIP phone to dial an emergency number, such as 9-1-1, the E-VoIP system transmits the physical coordinates of the VoIP phone to an Emergency Services 911 Call Center, which is also referred to as a Public Safety Answering Point ("PSAP"). Thus, the 911 operator is able to locate the caller wherever the VoIP phone is being used.

Figure 1:
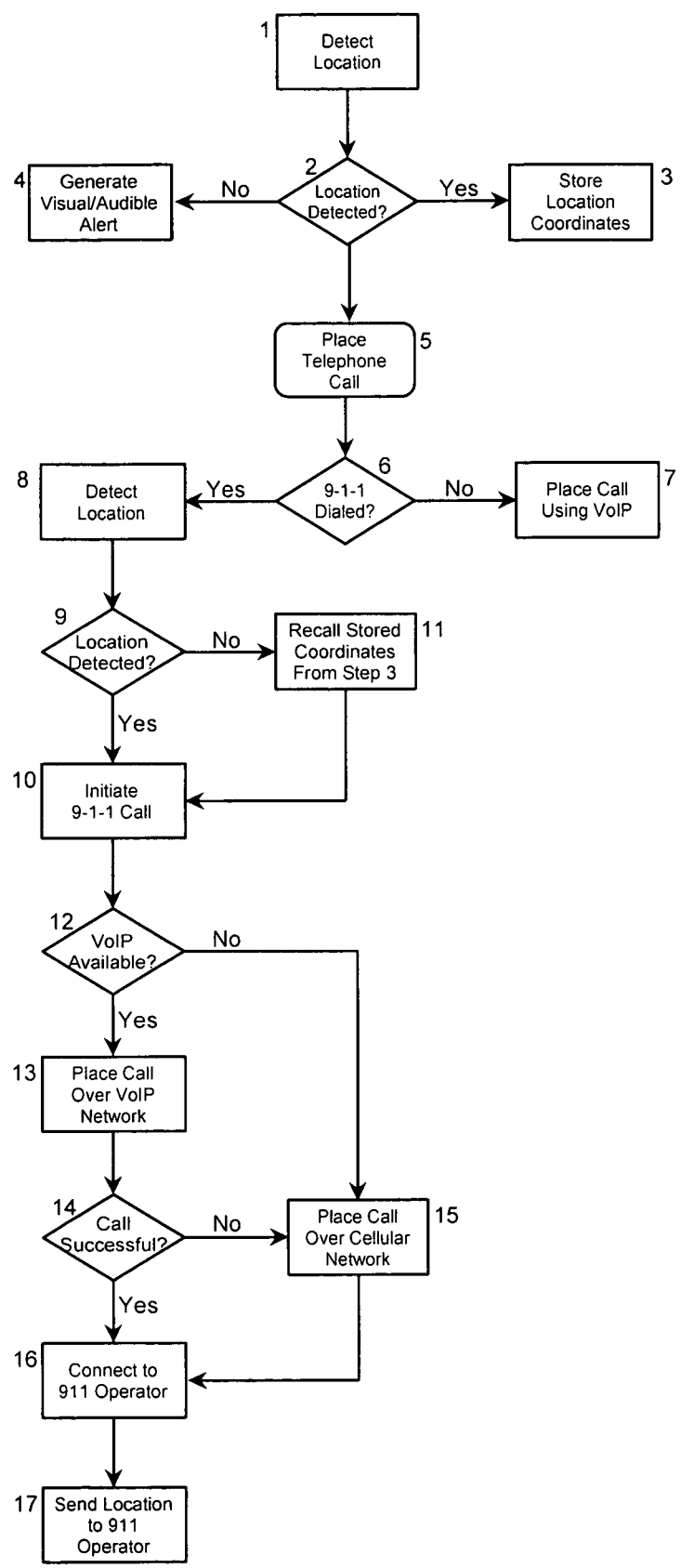
FIG. 1 is a flow chart illustrating an embodiment of an emergency services system of the present invention which is particularly useful for residential and small office settings.

The operation of one embodiment of the E-VoIP system of the present invention in the context of a residential setting is illustrated schematically in FIG. 1. The E-VoIP system employs either conventional GPS tracking technology or, for example, CDMA or GSM cellular technology, to determine the physical coordinates of the VoIP phone using existing triangulation techniques. In either case, when the VoIP phone is activated the E-VoIP system will search for an available GPS or cellular network and attempt to determine the physical coordinates of the phone (step 1). If the E-VoIP system is able to detect the physical coordinates of the phone (step 2), the E-VoIP system will store these coordinates in an associated memory for later use (step 3), as will be discussed below. This operation is ideally performed continuously at predefined time intervals or in response to one or more predefined events in order to provide the E-VoIP system with the most up-to-date information regarding the physical location of the VoIP phone.

If the E-VoIP system is unable to determine the physical coordinates of the phone, the E-VoIP system will generate a visual and/or audible alert to notify the caller that the coordinates have not been determined (step 4). This will not affect the functionality of the VoIP phone or prevent the caller from placing a call. The alert will merely notify the caller that the E-VoIP system is not able to determine the physical coordinates of the phone and will prompt the caller to move to another location with better reception. Thus, whether or not the E-VoIP system is able to determine the physical coordinates of the VoIP phone, the E-VoIP system will allow the caller to place a call (step 5).

The E-VoIP system allows the VoIP phone to be used in the same manner as a conventional analog or VoIP phone. However, the E-VoIP system will also monitor the digits which the user enters to determine whether the standard emergency contact number, such as 9-1-1, has been dialed (step 6). If a number other than 9-1-1 has been dialed, the E-VoIP system will allow the VoIP phone to place the call in the normal fashion (step 7).

However, if the E-VoIP system determines that the caller has dialed 9-1-1, the E-VoIP system will immediately attempt to determine the current physical coordinates of the VoIP phone through the GPS or cellular network (step 8). This will ensure that the E-VoIP system has the most current and accurate physical coordinates for the phone. If the E-VoIP system is able to determine the physical coordinates of the phone (step 9), the E-VoIP system will initiate the call to the Emergency Services 911 Call Center (step 10). If, however, the E-VoIP system is unable to immediately determine the physical coordinates of the VoIP phone through the GPS or cellular network, the E-VoIP system will recall the last coordinates which were stored in its associated memory (step 11). Since as described above the E-VoIP system continuously attempts to determine the physical coordinates of the phone in step 1 and then stores these coordinates in step 3, the E-VoIP system will always have relatively accurate coordinates for the phone, whether or not the E-VoIP system is able to immediately determine the exact coordinates through the GPS or cellular network in step 9. This feature is important to ensure that the E-VoIP system has relatively accurate coordinates for the E-VoIP phone in the event the phone is relocated often.

Once the current or last-stored physical coordinates of the VoIP phone have been determined, the E-VoIP system will initiate the call to the Emergency Services 911 Call Center (step 10). The E-VoIP system will first determine if the VoIP service to which the VoIP is connected is available (step 12). If it is, then the E-VoIP system will route the call over the VoIP network (step 13) and will monitor the call to determine if it has been successfully completed (step 14). If the call is successfully completed over the VoIP network, the E-VoIP system will connect the user to the Emergency Services 911 Call Center (step 16). However, if the E-VoIP system determines that the VoIP service is unavailable for any reason, such as a power loss or equipment failure, or that the call was not successfully completed over the VoIP network, the E-VoIP system will complete the call over the cellular network using the conventional E-911 system (step 15).

Once the call is connected to the Emergency Services 911 Call Center, the E-VoIP system will transmit the current or last-stored physical coordinates of the VoIP phone to the 911 operator (step 17). In one embodiment of the present invention, the E-VoIP system transmits the physical coordinates as part of a data packet which may also comprise the user's name, telephone number and the last time the physical coordinates were determined, among other information. This data packet is ideally capable of signaling the Internet routers and other network devices that it is a High Priority packet which should be placed at the beginning of all queues. This prioritizing mechanism is known as the Quality of Service (QoS) protocol, under which certain packets are sent before others due to the demand and time factors associated with such packets.

Once the call has been connected to the Emergency Services 911 Call Center, the physical coordinates of the VoIP phone are transmitted to the 911 operator, where they can be resolved with a corresponding street address using suitable means, such as a conventional mapping program. The 911 operator can then assist the caller in the usual fashion. Thus, the entire operation can be completed, and the caller's street address communicated, without the caller having to actually speak with the 911 operator.

Figure 2:
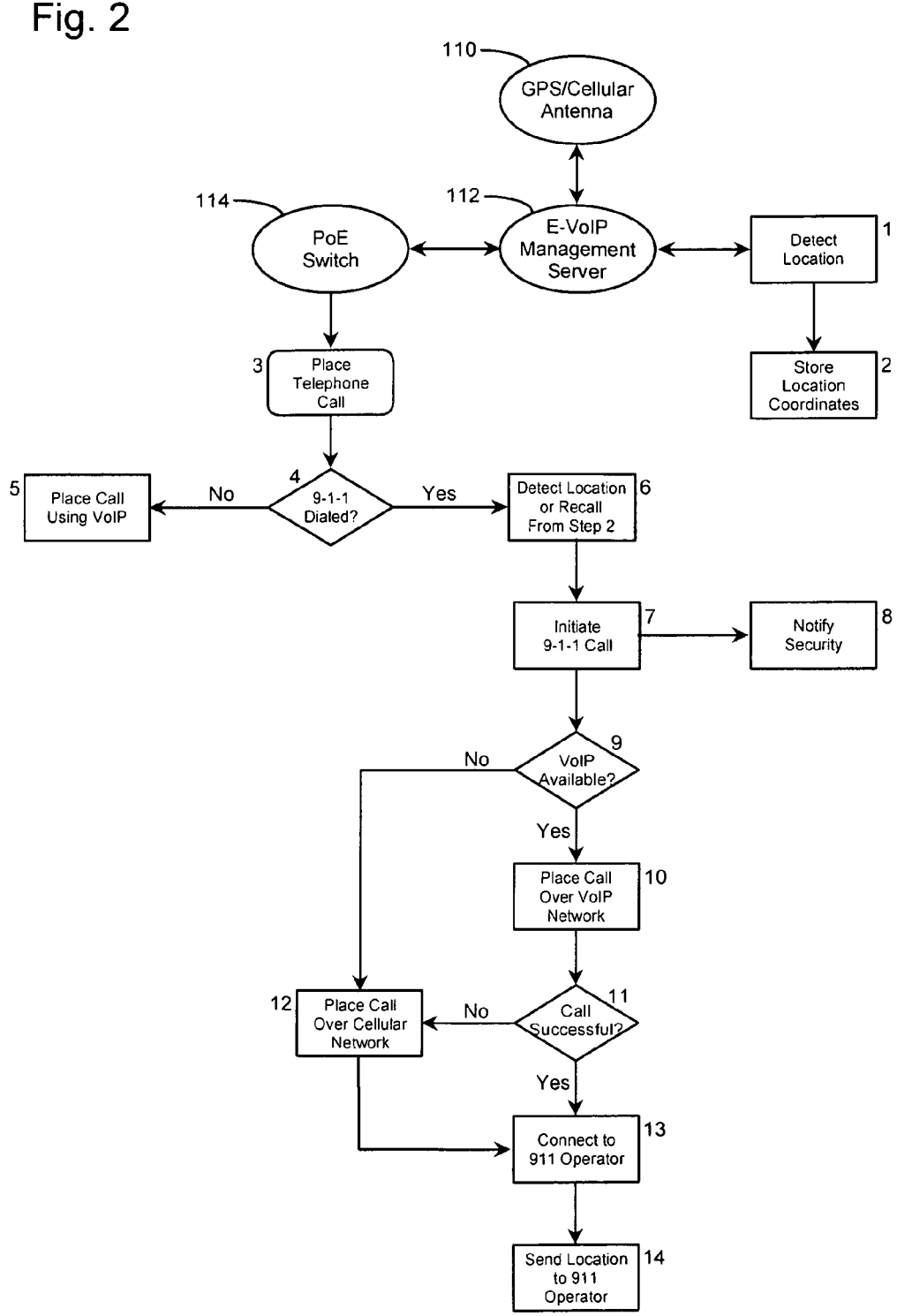
FIG. 2 is a flow chart illustrating an embodiment of an emergency services system of the present invention which is particularly useful for applications involving multiple VoIP users in a single building.

Referring now to FIG. 2, the operation of an embodiment of the E-VoIP system for multiple VoIP users in a single commercial, industrial or residential building will now be discussed. In these types of buildings, the ability of the E-VoIP system to receive the GPS or cellular signals which are used to determine the physical coordinates of the VoIP phone may be hindered by the amount and strength of the materials used in the construction of the buildings. In accordance with the present invention, therefore, the E-VoIP system for multiple VoIP users ideally comprises a number of separate GPS or cellular antennas 110 to determine the physical coordinates of the building and, in one embodiment of the invention, the physical coordinates of the VoIP phone within the building. In a preferred embodiment of the invention, these antennas 110 are positioned where the reception is greatest, such as on the roof of the building.

The E-VoIP system for multiple VoIP users also includes an E-VoIP Management Server 112. The E-VoIP Management Server 112 comprises the components which enable the E-VoIP system to determine the physical coordinates of the building and, in one embodiment of the invention, the location of each VoIP phone within the building. In this embodiment of the invention, the E-VoIP system determines the physical coordinates of the building by triangulating the GPS or cellular signals which are received from the GPS or cellular network over a single antenna 110. In addition, the exact location of each E-VoIP phone within the building is pre-stored in the E-VoIP Management Server 112 by, for example, a system administrator. Thus, when the user dials 9-1-1, the E-VoIP management server is able to communicate both the location of the building and the location of the VoIP phone within the building to the Emergency Services 911 Call Center.

The E-VoIP Management Server 112 may be connected to each VoIP phone via a PoE switch 114. In addition to transmitting data between the E-VoIP Management Server 112 and the VoIP phones, the PoE switch 114 provides operating power to the phones. This feature is important since, in the event of a power failure in all or part of the building, the phones may be powered by an uninterrupted power supply which is connected to the PoE switch 114.

The E-VoIP Management Server 112 may use the POE switch 114 to identify each VoIP phone within the building. In this regard, each VoIP phone may be connected to a corresponding port on the PoE switch 114. In addition, each port on the PoE switch 114 may be manually labeled in the E-VoIP Management Server 112 with certain information concerning its corresponding VoIP phone. This information may include the number of the office in which the VoIP phone is located, the name of the occupant of the office, and any known medical conditions of the occupant, e.g., asthma, heart condition, diabetes, etc. Thus, when a specific VoIP phone accesses the PoE switch 114, the E-VoIP Management Server 112 will be able to immediately identify the physical location of that phone within the building.

In operation, the E-VoIP system will periodically access the GPS or cellular network in order to determine the physical coordinates of the VoIP phone (step 1). As discussed above, this step may involve first determining the physical coordinates of the building via the GPS or cellular network, and then recalling the location of the E-VoIP phone within the building from the E-VoIP Management Server 112. Alternatively, this step may involve determining the physical coordinates of both the building and the VoIP phone via the GPS or cellular network. In this alternative embodiment, the E-VoIP system is configured to operate in the manner described above in connection with FIG. 1 to determine the physical coordinates of the VoIP phone within the building by triangulating the GPS or cellular signals which are transmitted between the phone and a number of the antennas 110. In either case, the E-VoIP system will then store the coordinates of the VoIP phone in the E-VoIP Management Server 112 for later use (step 2), as will be discussed below.

When a caller wishes to make a telephone call, he will dial a desired number into the VoIP phone in the normal fashion (step 3). The E-VoIP system will monitor the numbers entered into the VoIP phone to determine if the number 9-1-1 has been dialed (Step 4). If the number 9-1-1 has not been dialed, the VoIP phone will complete the call in the conventional manner (step 5).

If, however, the E-VoIP system determines that the number 9-1-1 has been dialed, the E-VoIP system will access the GPS or cellular network to obtain the physical coordinates of the VoIP phone in the manner discussed above or, if this operation is unsuccessful, recall the stored physical coordinates from the E-VoIP Management Server 112 (step 6). Alternatively, if the interval at which the E-VoIP system detects the physical coordinates of the phone in step 1 is relatively short, the E-VoIP system may forgo attempting to access the GPS or cellular network to obtain the coordinates and instead simply recall the stored coordinates from the E-VoIP Management Server. Once the E-VoIP system has obtained the physical coordinates of the phone, it will initiate the call to the Emergency Services 911 Call Center (step 7). At this point, the VoIP system may also notify the building security office so that appropriate actions can be taken (step 8).

When placing the call to the Emergency Services 911 Call Center, the E-VoIP system will first determine if the VoIP service to which the VoIP phone is connected is available (step 9). If it is, then the E-VoIP system will route the call over the VoIP network (step 10) and will monitor the call to determine if it has been successfully completed (step 11). If the call is successfully completed over the VoIP network, the E-VoIP system will connect the caller to the Emergency Services 911 Call Center (step 13). However, if the E-VoIP system determines that the VoIP service is unavailable for any reason or that the call was not successfully completed over the VoIP network, the E-VoIP system will complete the call over either the cellular network using the conventional E-911 system or the POTS (step 12).

Once the call is connected to the Emergency Services 911 Call Center (step 13), the E-VoIP system will transmit the pertinent information concerning the VoIP phone to the 911 operator (step 14). This information, which is stored in the E-VoIP Management Server 112, may include the physical coordinates of the building, the street address of the building and the exact location within the building of the VoIP phone from which the call originated. One method for transmitting this information is to include it in a data packet which is routed over the Internet using the QoS protocol.

Figure 3:
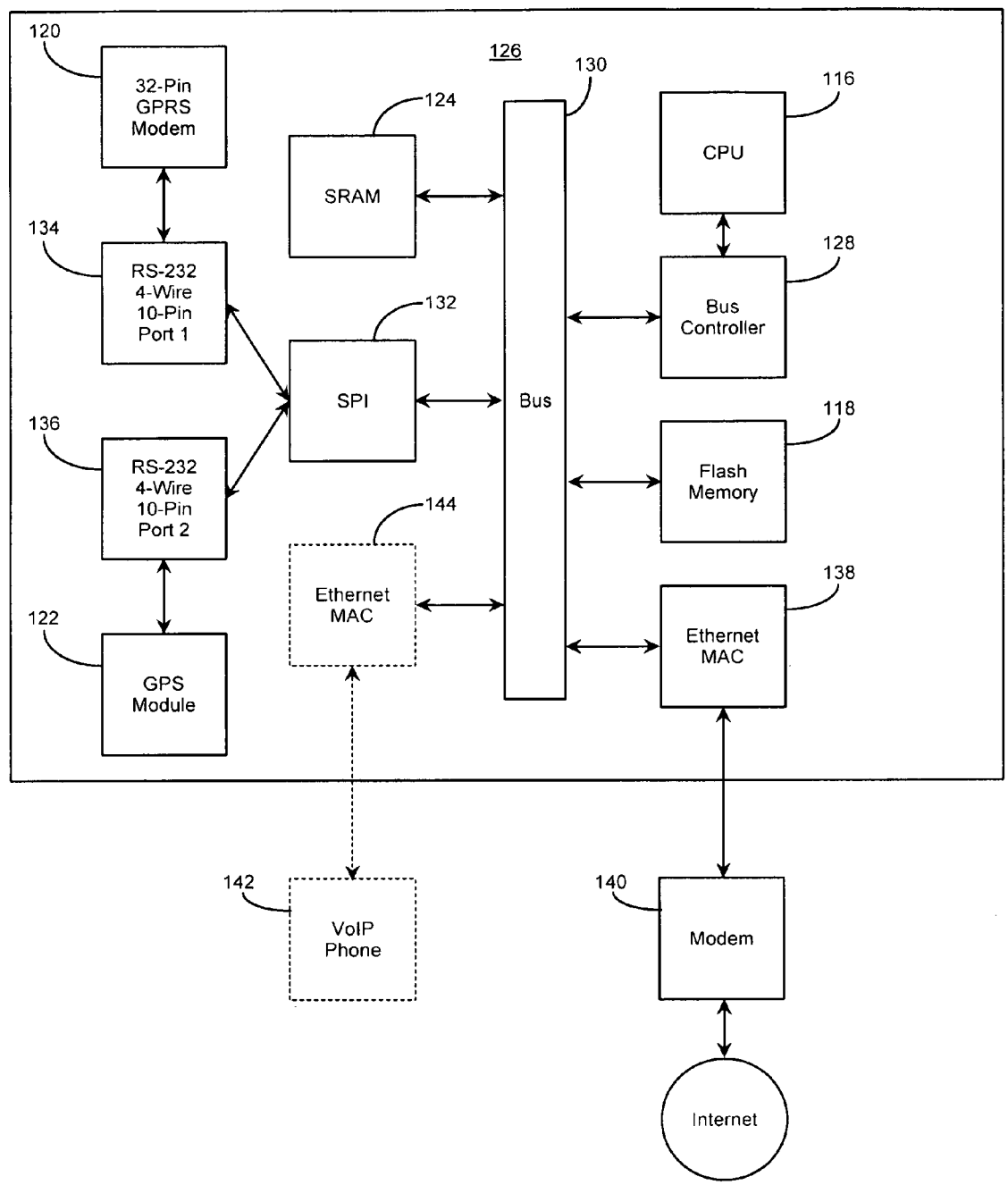
FIG. 3 is a schematic representation of a physical embodiment of the emergency services system of the present invention.

One embodiment of a physical device in which the E-VoIP system of the present invention may be incorporated is illustrated schematically in FIG. 3. As mentioned above, the E-VoIP system may be integrated into a special-built VoIP phone, into a separate device which is connected to a conventional VoIP phone, or into a stand-alone network device such as a host, a server, a switch or a router. With a few minor modifications which will be readily apparent to those of ordinary skill in the art, the following description will apply to any of these applications.

As shown in FIG. 3, the VoIP device comprises a controller 116, a read-only memory device 118, such as an electrically erasable, programmable, read-only memory ("EEPROM"), at least one of a cellular module 120 and a GPS module 122, and preferably also a random access memory device 124, such as a static random access memory ("SRAM"). The controller 116 may comprise a Zilog™ EZ80Acclaim™ Micro Controller Unit, in which event the E-VoIP device may be assembled using a Zilog™ extended Modular Development System board 126. Also, the cellular module 120 may comprise any suitable 32-pin GPRS modem, and the GPS module 122 may comprise, for example, either a Lassen SQ module or a Lassen IQ module, both of which are sold by Trimble Navigation Ltd. of Sunnyvale, Calif.

The controller 116 is connected to the memory device 118 through a conventional bus controller 128 and system bus 130. The memory device 118 stores the operating system for the VoIP device, as well as the physical coordinates determined by the cellular module 120 and/or the GPS module 122 and the associated street address, caller identification and other information which the E-VoIP system transmits to the Emergency Services 911 Call Center.

In an exemplary embodiment of the invention, the controller 116 communicates with the cellular module 120, if present, through the system bus 130, a serial parallel interface ("SPI") 132 and a serial bus 134. The serial bus 134 may comprise, for example, an RS-232 4-wire 10-pin port. Similarly, the controller 116 communicates with the GPS module 122, if present, through the system bus 130, the SPI 132 and a serial bus 136, which may be the same as or similar to the serial bus 134.

In the embodiment of the invention wherein the E-VoIP system is integrated into a VoIP phone, the E-VoIP system may be connected to the internet through a standard Ethernet Media Access Control Module ("MAC") 138, utilizing Ethernet protocol 802.2 and/or 802.3, and a suitable modem 140. The Ethernet MAC 138 and the modem 140 may be the same Ethernet MAC and modem by which the VoIP phone is normally connected to the internet.

In the embodiment of the invention wherein the E-VoIP system comprises a separate device which is connected to a conventional VoIP phone 142 (as shown in phantom in FIG. 3), the phone may be connected to the device through a second Ethernet MAC 144, and the device may in turn be connected to the internet through the Ethernet MAC 138 and the modem 140.

In operation of one embodiment of the E-VoIP device which is adapted for residential use, the E-VoIP device will remain in a "wait" state until the caller activates the VoIP phone. In the wait state, the controller 116 may probe the GPS module 122 at predefined intervals in order to obtain the then-current physical coordinates of the VoIP phone. If the GPS network is not available during any of these attempts, the controller 116 may probe the cellular module 120 in order to obtain the then-current physical coordinates of the VoIP phone. This data will then be stored in the memory device 118 until needed.

When the caller activates the VoIP phone to make a telephone call, the controller 116 will probe the GPS module 122 in an attempt to determine the current physical coordinates of the phone. If a GPS signal is not available or the controller 116 cannot determine the physical coordinates of the phone from the GPS network, the controller 116 will probe the cellular module 120 in an attempt to determine the physical coordinates of the phone. If the cellular signal is not available or the controller 116 cannot determine the physical coordinates of the phone from the cellular network, the controller 116 will activate an LED and/or a speaker in order to notify the caller that the coordinates of the E-VoIP phone cannot be determined with the VoIP phone in its current location. The controller 116 will also periodically probe the cellular module 120 to ensure that a connection to a cellular tower is available. As with the GPS signal notification, the controller 116 will activate an LED and/or a speaker to notify the caller if a cellular connection is unavailable.

If the caller dials 9-1-1, the controller 116 will again probe the GPS module 122 and, if necessary, the cellular module 120 to determine the physical coordinates of the VoIP phone. If the physical coordinates are detected, the controller 116 will store these coordinates in the memory device 118. The controller 116 will then probe the Ethernet MAC 138 to determine if this connection is available and that the VoIP phone can connect to the Emergency Services 911 Call Center through the Internet. If the Ethernet connection is not available for any reason, the controller 116 will connect to the cellular E-911 service through the cellular module 120. Alternatively, the controller 116 may bypass the Ethernet connection entirely and connect directly to the E-911 service through the cellular module 120. When the Emergency Services 911 Call Center receives the call, the controller 116 will notify the end user detection system that the call is originating from an IP telephony device and then transmit the last-stored physical coordinates of the VoIP phone to the call center. The Emergency Services 911 Call Center will then resolve these physical coordinates to the appropriate street address and dispatch the Emergency Services to this address as needed.

In the context of the present application, the term "E-VoIP phone" should be construed to include any VoIP-type device over a call may be placed. For example, the E-VoIP system of the present invention can be used with "soft phones". A soft phone is a software based VoIP phone which uses the computer's internet connection to make and receive telephone calls. In this embodiment of the invention, the E-VoIP system may be integrated into the soft phone, into the computer, or into a separate device which interfaces with the computer. In addition, the computer running the soft phone application can use USB GPS, PCMCIA GPS, Bluetooth GPS, EVDO, RT1x, or other cellular methods to obtain the physical coordinates of the VoIP phone.

In accordance with another embodiment of the present invention, the reliability of the E-VoIP system is enhanced by using multiple available location detection technologies ("LDT's") to simultaneously detect the current location of the VoIP phone. LDT's provide the ability to accurately determine the location of the E-VoIP phone with sufficient accuracy to aid the emergency responders in locating the caller. Current LDT's include geolocation, location based service (LBS), GSM localization, triangulation, automatic location information (ALI) database correlation, coordinate information and other systems. In addition to the GPS, CDMA and GSM technologies discussed above, location data can also be obtained from the Assisted Global Positioning System ("A-GPS"), other Cellular systems, Wi-Fi, WiMAX, and other such technologies that can provide geolocation information.

The use of multiple LDT's increases the likelihood that the location of the VoIP phone will be successfully detected whenever and wherever the phone is used. In addition, location data from the individual LDT's can be compared to determine if any discrepancies exist, in which event the E-VoIP system can, for example, generate a perceptible signal indicative of the fact that the location data is not reliable. The discrepancies in the location data can also be noted in the information sent by the VoIP phone to the PSAP.

Figure 4:
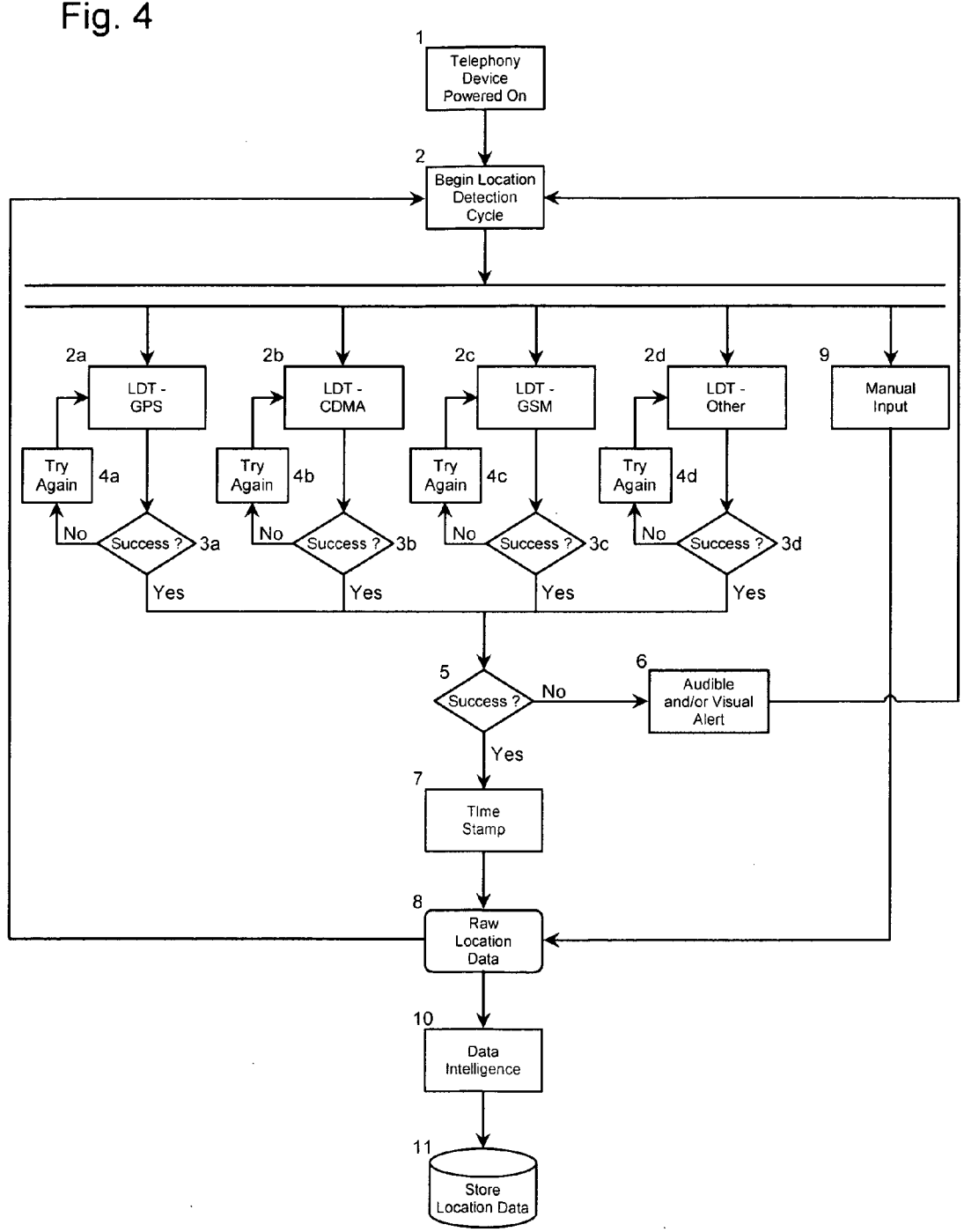
FIG. 4 is a flow chart illustrating an embodiment of the present invention for periodically determining the physical location of a VoIP telephony device.

The process for determining the physical location of the VoIP phone using multiple LDT's will be explained with reference to FIG. 4. Once the VoIP phone is powered on (step 1), the E-VoIP system will periodically attempt to detect the physical location of the phone by initiating a location detection cycle, e.g., every 60 seconds (step 2). For each location detection cycle, the E-VoIP system will attempt to obtain the physical location of the VoIP phone using multiple LDT's, such as GPS (step 2*a*), CDMA (step 2*b*), GSM (step 2*c*), and any number of additional suitable technologies (step 2*d*). These attempts using the multiple LDT's may be made successively or in parallel. During each attempt, the E-VoIP system will determine if that particular LDT was successful in detecting the location of the VoIP phone (steps 3*a*-3*d*). If an attempt to detect the location of the phone using a particular LDT is not successful, the E-VoIP system will try again using that LDT and will continue to do so until a preset data acquisition interval, e.g., 15 seconds, has elapsed (steps 4*a*-4*d*). The E-VoIP system will then determine whether during the data acquisition interval any of the attempts to detect the location of the VoIP phone using any of the LDT's was successful (step 5). If none of the attempts was successful, the E-VoIP system may generate an audible or visual alert to notify the user of that fact (step 6), and then return to step 2, where it will await the beginning of the next location detection cycle.

If during a location detection cycle the E-VoIP system determines in step 5 that at least one LDT was successful in detecting the location of the VoIP phone, the location data generated by the successful LDT will ideally be time stamped in order to relate the phone's location to a particular moment in time (step 7). The location data may be time stamped using, for example, the Coordinated. Universal Time (UTC) system to ensure that the data is accurate and relevant across time zones. In addition, the E-VoIP system may include the ability to obtain its current Time Zone based upon the current physical location determined by the LDT. Once the location data has been acquired and time stamped, this data may be stored for further processing (step 8). In addition, the E-VoIP system will return to step 2 to await the beginning of the next location detection cycle.

In addition to using multiple LDT's to detect the location of the VoIP phone, the user may manually input his location into the VoIP system (step 9). This procedure may prove advantageous when the user expects to remain at a particular location for an extended period of time, when the user is located where none of the LDT's is available, or in other situations where manual input may be important or expedient.

After the time-stamped location data is stored, the E-VoIP system may process this data and/or add additional information to the data (step 10) prior to storing the enhanced location data for future use (step 11). For example, the time-stamped location information from a plurality of location detection cycles may be used to determine such historical information as the direction, speed and route of the VoIP phone. This information may be important when, for example, the user is placing the emergency call from a moving vehicle. In addition, the location data may be combined with other information, such as the user's name, medical condition, medical history, personal information, emergency contact information, and other information that may be useful to an emergency responder. Such additional information may be manually entered into the VoIP phone by the user or obtained from devices which are connected to the E-VoIP system.

In accordance with another embodiment of the present invention, the reliability of the E-VoIP system is further enhanced by determining in advance the best available network over which to place the emergency call. The networks over which the E-VoIP system may place the emergency call may include the LDT's listed above for detecting the physical location of the VoIP phone, as well as the networks which are associated with the VoIP network, such as the internet, a private intranet or LAN, Wi-Fi network, or the WiMAX network, among others. The E-VoIP system may also include the ability to place an emergency call over the POTS.

Figure 5:
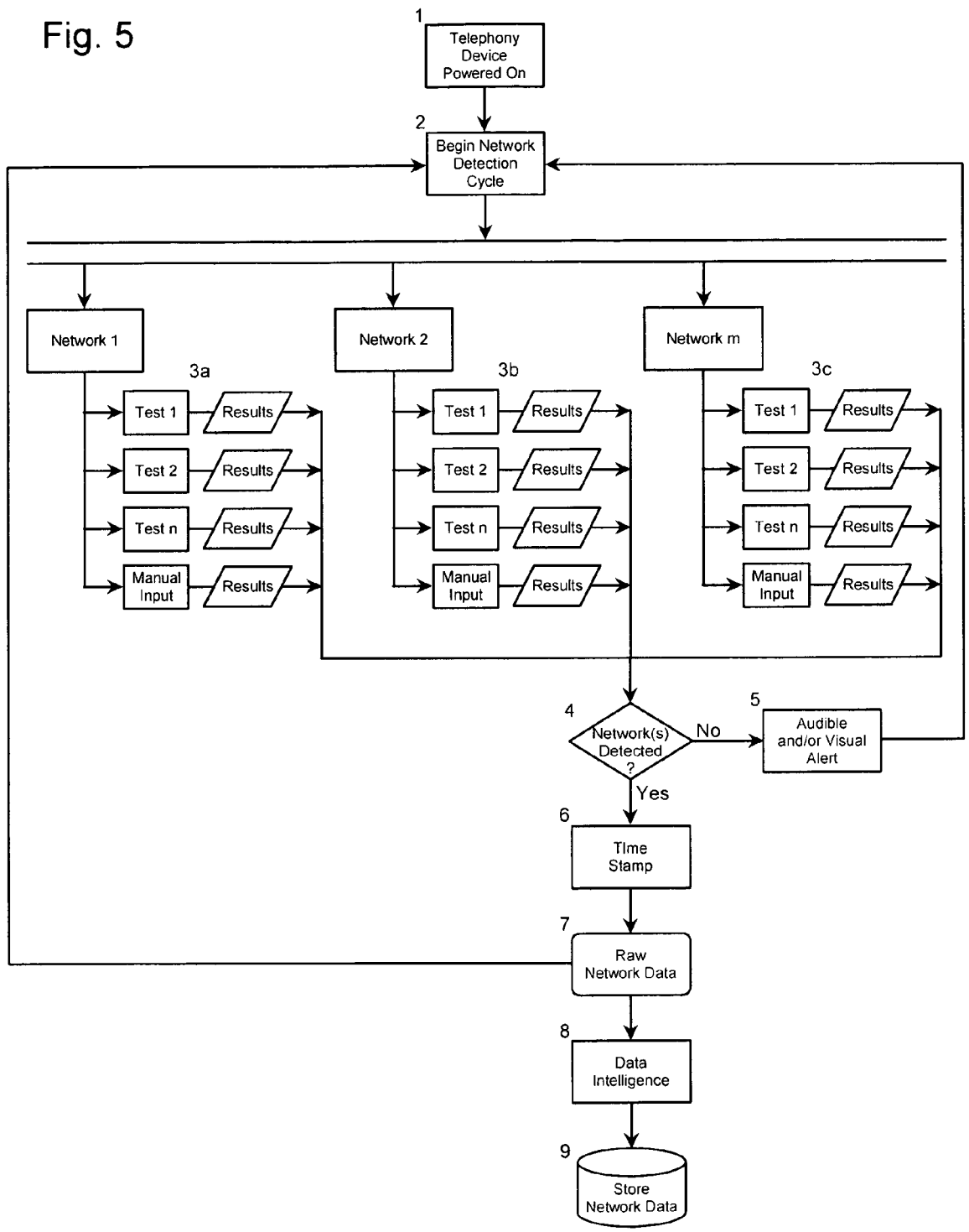
FIG. 5 is a flow chart illustrating an embodiment of the present invention for periodically determining the networks which are available to the VoIP telephony device.

The process for determining the best available network will be explained with reference to FIG. 5. Once the VoIP phone is powered on (step 1), the E-VoIP system will periodically attempt to detect and test the networks by initiating a network detection cycle, e.g., every 60 seconds (step 2). During each network detection cycle, the E-VoIP system will perform a number of tests on each network to determine its availability, reliability and speed (steps 3a-3c). These tests may include detecting a dial-tone, determining quality, signal strength and reliability, performing line tests, and determining latency, jitter, Mean Opinion Score (MOS) and R-factor. In addition, the E-VoIP system may evaluate historical attempts to connect to the network, historical test results for the network and human input factors relating to the network. Based on the results of the tests and inputs for each network, the E-VoIP system will assign that network a network quality score indicative of its availability, reliability and speed.

After a predefined period of time, e.g., 15 seconds, the E-VoIP system will determine if any of the networks could be detected (step 4). If not, the E-VoIP system may generate an audible and/or visual alert to notify the user of this fact (step 5), and then return the process to step 2 to await the beginning of the next network detection cycle.

If after the predefined period of time at least one network is detected, the E-VoIP system will time stamp the data relating to the identity and quality score of each network (step 6), and store this raw network data for further processing (step 7). The E-VoIP system will then return the process to step 2 to await the beginning of the next network detection cycle.

After the time-stamped network data is stored, the E-VoIP system ideally processes the data by, for example, ranking each network based on its quality score and then creating a priority list of the networks from best to worst (step 8). The resulting network data is then stored for future use (step 9).

Figure 6A:
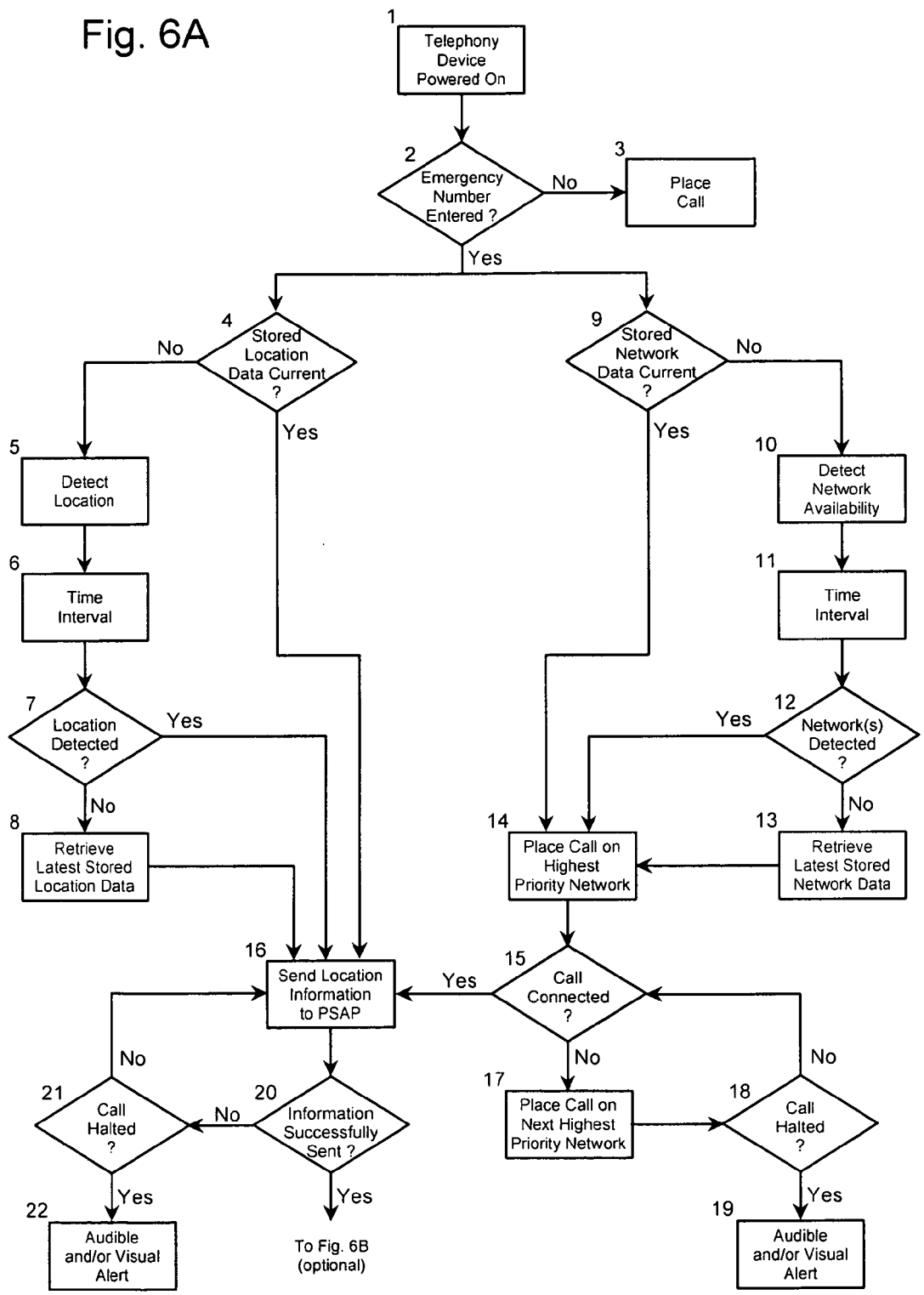
FIG. 6A is a flow chart illustrating the procedural steps which are executed in an embodiment of the present invention when an emergency number is entered into the VoIP telephony device.

Referring now to FIG. 6A, the operation of a further embodiment of the VoIP system of the present invention will now be described. Once the VoIP phone is powered on (step 1), the E-VoIP system will monitor the digits entered by the user to determine whether an emergency contact number, such as 9-1-1, has been dialed (step 2). If a number other than the emergency number has been dialed, the E-VoIP system will allow the VoIP phone to place the call in the normal fashion (step 3).

However, if the emergency number has been dialed, the E-VoIP system will proceed to determine the location of the E-VoIP phone. In order to do this, the E-VoIP system may first determine whether the location data stored in step 11 of the procedure illustrated in FIG. 4 is current, e.g., less than 5 minutes old (step 4). If the location data is current, the E-VoIP system will send this data to the PSAP when the call is connected (step 16). However, if the location data stored in step 11 of the FIG. 4 procedure is not current, the E-VoIP system will make an attempt to detect the physical location of the phone (step 5). After the expiration of a predefined time interval, e.g., 15 seconds (step 6), the E-VoIP system will determine whether the attempt to detect the location of the E-VoIP phone was successful (step 7). If the attempt was successful, the E-VoIP system will send this location data to the PSAP when the call is connected (step 16). However, if the attempt to detect the location of the E-VoIP phone was not successful, the E-VoIP system will retrieve the most recent location data from step 11 of the FIG. 4 procedure (step 8) and send this data to the PSAP when the call is connected. Although this stored data is not as current as desired, it may nevertheless provide a good indication of the general location of the E-VoIP phone.

At or around the same time the E-VoIP system is determining the physical location of the E-VoIP phone, it will also determine the best network over which to place the call to the PSAP. In order to do this, the E-VoIP system may first determine whether the network data stored in step 9 of the procedure illustrated in FIG. 5 is current, e.g., less than 5 minutes old (step 9). If the network data is current, the E-VoIP system will attempt to place the call over the highest priority network in the priority list (step 14). However, if the stored network data is not current, the E-VoIP system will make an attempt to detect the available networks, preferably using the procedures discussed above (step 10). After the expiration of a predefined time interval, e.g. 15 seconds (step 11), the E-VoIP system will determine whether any networks could be detected (Step 12). If no networks could be detected, the E-VoIP system will retrieve the latest stored network data from step 9 of the FIG. 5 procedure (step 13) and attempt to place the call over the highest priority network (step 14). However, if one or more networks were detected, the E-VoIP system will attempt to place the call over the network with the highest priority (step 14).

The E-VoIP system will then determine whether the call has been connected to the PSAP (step 15). If the call has been connected, the PSAP will send the location data to the PSAP (step 16). However, if the call was not connected, the E-VoIP system will attempt to place the call on the next highest priority network (step 17). Unless the call has been halted, e.g., by being terminated by the user or dropped by the network (step 18), the E-VoIP system will once again determine whether the call has been connected to the PSAP (step 15). If the call has not been connected, the E-VoIP system will continue to attempt to place the call over the next highest priority network until the call is either connected or halted. If the call has been halted, the E-VoIP system may generate an audible or visual alert to notify the user of this fact (step 19).

Once the call is connected to the PSAP, the E-VoIP system will send the location data to the PSAP (step 16). The E-VoIP system will continue to monitor the transmission to determine whether the location data was successfully sent (step 20). If the location data has not been successfully sent, the E-VoIP system will determine whether the call has been halted (step 21). If it has not, the E-VoIP system will again send the location data to the PSAP (step 16). However, if the call has been halted, the E-VoIP system may generate an audible or visual alert to notify the user of this fact (step 22).

Figure 6B:
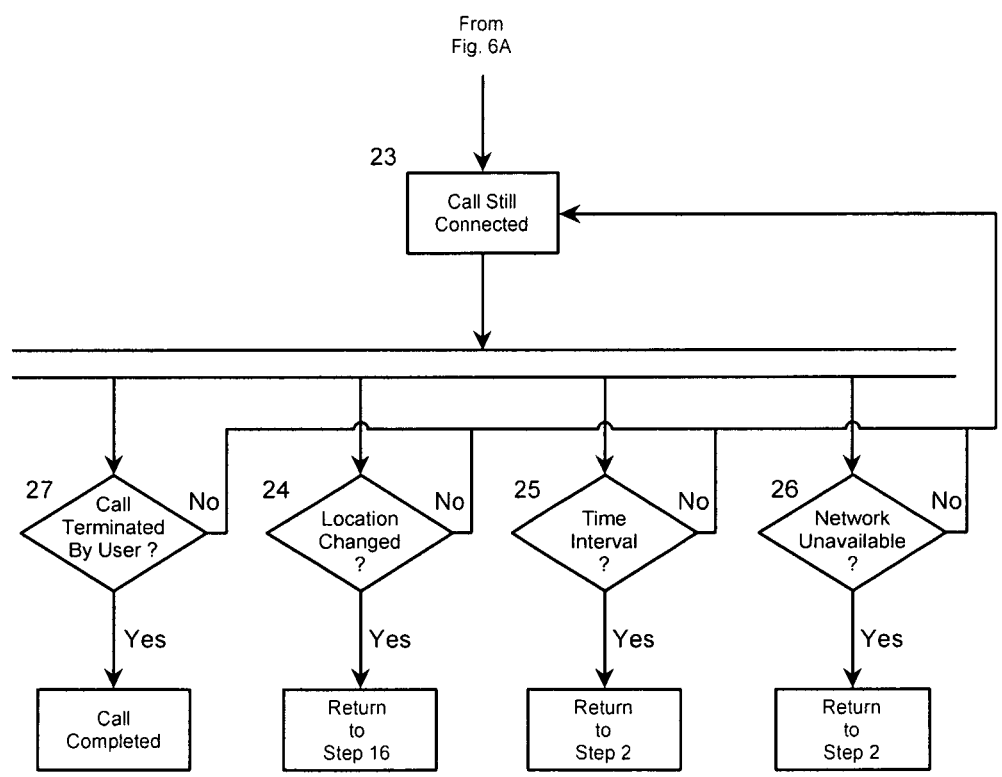
FIG. 6B is a flow chart illustrating further procedural steps which may be executed in an alternative to the embodiment of the invention shown in FIG. 6A.

Once the location data has been successfully sent to the PSAP, the E-VoIP system may continue to monitor the call in order to update the PSAP on the location of the VoIP phone and the condition of the caller. Referring to FIG. 6B, the E-VoIP system first determines whether the call is still connected to the PSAP (step 23). If it is, the E-VoIP system will execute a number of tasks, either successively or in parallel, in order to keep the PSAP apprised of the current location of the E-VoIP phone. First, the E-VoIP system will determine whether the location of the VoIP phone has changed by detecting the current location of the phone and comparing this location data with the location data that was sent to the PSAP (step 24). If the location of the VoIP phone has changed, the E-VoIP system will return to step 16 and transmit the latest location data to the PSAP.

Also, the E-VoIP system may determine whether a preset time interval, e.g., 10 minutes, has elapsed (step 25). This may be indicative of the fact that the call to the PSAP has been inadvertently dropped. Thus, if the preset time interval has elapsed, the E-VoIP system will return the process to step 2 to begin a new call.

In addition, the E-VoIP system may determine whether the network over which the call has been placed is still available (step 26). If it is not, the E-VoIP system will return the process to step 2 to begin a new call.

Finally, the E-VoIP system may continue to monitor the call to determine whether the user has terminated the call (step 27).

Thus, the E-VoIP system of the present invention offers many advantages. Once an emergency number is dialed, the E-VoIP system will determine the age of the stored location data. If the location data is current, the system will place the call over the highest priority network. If the call is unsuccessful, the network is no longer available, the location data could not be transmitted, the call was disconnected by the user, etc., the E-VoIP system will attempt to place the call over the next network in the priority list. The E-VoIP system will continue attempting to connect the call to the PSAP utilizing all options available until successful or until the call is halted. If all methods to connect to the PSAP and transmit the location data are exhausted, the E-VoIP system will run the network tests again to determine the priority of the available networks. If for any reason the tests are unsuccessful, the E-VoIP system may use a round robin method of attempting to place the call over each available network.

In order to assist in determining the best available network quickly and reliably, the E-VoIP system may conduct network tests continuously in the background. During the call, the system will monitor the status of the all the available networks and, if the network currently being used is disrupted, the system will switch to the next prioritized network in order to re-establish the call. In parallel, the system may determine when the user disconnects the call and take appropriate action(s). In addition, the system will monitor and provide notification of changes in the physical location of the E-VoIP phone. This is important, as services that were connected in the previous location may no longer be available in the new location and the device may therefore need to verify and potentially re-establish connectivity with the PSAP. The physical location change of the E-VoIP device is also important for the PSAP to know so that it can dispatch the required emergency responders to the proper location and note that the device might possibly be in transit. Furthermore, the timeouts that are configured for the current location and connectivity assessments are still applicable. If the call extends beyond the preset time interval, the E-VoIP system can again poll for its location and network connectivity status.

After the call is connected to the PSAP, the location data will be transmitted. This data will contain the most recent location data and may include historical data. Since all location data is time stamped, the PSAP is able to identify the staleness of the data to better qualify the accuracy and relevance of the information obtained.

It should be noted that emergency responders may be stationed locally in relation to the VoIP device. For these situations, for example, commercial buildings and business environments, the E-VoIP system may, in addition to the PSAP, notify the local authorities of the location of the E-VoIP phone. Such notification can help decrease the time to respond. Thus, the E-VoIP system will support the ability to be configured with a Local Emergency Services profile that will enable unique emergency contact numbers to be used with the system. Many corporations are providing VoIP phones for users that are virtual employees to enable them to communicate effectively without needing to purchase separate phones, phone plans, and infrastructure. If the device detects that it is no longer on the premises where the local emergency services have authority, the system will notify the user that it has it has changed from a network managed emergency services profile to a standardized coordinate-based system for emergency services.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

We claim:

1. A method for determining the physical location of a VoIP phone and transmitting the physical location to an emergency services call center or the like, the method comprising:
    making a plurality of attempts to determine the physical location of the VoIP phone, each using a separate location detection technology ("LDT"):
    if an attempt is successful, storing the physical location determined using the corresponding LDT;
    placing a call to the emergency services call center with the VoIP phone; and
    automatically transmitting the physical location of the VoIP phone to the emergency services call center.

2. The method of claim 1, wherein the plurality of attempts are made simultaneously.

3. The method of claim 1, wherein the plurality of attempts are made successively.

4. The method of claim 1, further comprising:
    manually inputting the physical location of the VoIP phone into the VoIP phone; and
    when the VoIP phone is used to place a call to the emergency services call center, automatically transmitting the manually input physical location to the emergency services call center.

5. The method of claim 1, wherein if after a predetermined period of time none of the attempts to determine the physical location of the VoIP phone is successful, generating a perceptible signal indicative of the fact that the physical location of the VoIP phone was not determined.

6. The method of claim 1, wherein if an attempt to determine the physical location of the VoIP phone using a first LDT is not successful, making a further attempt to determine the physical location of the VoIP phone using the first LDT.

7. The method of claim 6, wherein if an attempt to determine the physical location of the VoIP phone using a second LDT is not successful, making a further attempt to determine the physical location of the VoIP phone using the second LDT.

8. The method of claim 7, wherein if the further attempts to determine the physical location of the VoIP phone using the first and second LDT's are not successful, generating a perceptible signal indicative of the fact that the physical location of the VoIP phone was not determined.

9. The method of claim 1, wherein if an attempt to determine the physical location of the VoIP phone using a first LDT is not successful, periodically making further attempts to determine the physical location of the VoIP phone using the first LDT.

10. The method of claim 9, wherein if an attempt to determine the physical location of the VoIP phone using a second LDT is not successful, periodically making further attempts to determine the physical location of the VoIP phone using the second LDT.

11. The method of claim 10, wherein if after the predetermined period of time the further attempts to determine the physical location of the VoIP phone using the first and second LDT's are unsuccessful, generating a perceptible signal indicative of the fact that the physical location of the VoIP phone was not determined.

12. The method of claim 1, further comprising:
comparing the physical location determined using a first LDT with the physical location determined using a second LDT; and
if the physical locations determined using the first and second LDT's differ by a predetermined amount, generating a perceptible signal indicative of the existence of the difference.

13. The method of claim 1, wherein the step of making a plurality of attempts to determine the physical location of the VoIP phone is repeated periodically.

14. The method of claim 13, wherein for each time a plurality of attempts is made, time stamping and storing the physical location of the VoIP phone determined during a successful attempt.

15. The method of claim 14, further comprising determining at least one of a speed, a direction and a route of the VoIP phone from a plurality of said time stamped and stored physical locations.

16. The method of claim 1, further comprising attempting to detect each of a plurality of networks over which the call may be placed.

17. The method of claim 16, wherein if none of the networks can be detected, generating a perceptible signal indicative of the fact that no network is available over which to place the call.

18. The method of claim 16, further comprising testing each detected network and ranking the detected networks based on the results of the tests.

19. The method of claim 18, wherein the testing step comprises determining at least the quality of each detected network.

20. The method of claim 18, further comprising placing the call over the network which ranks above the other networks.

21. The method of claim 20, further comprising monitoring the call to determine if the physical location was successfully received by the emergency services call center.

22. The method of claim 18, wherein the attempting, testing and ranking steps are performed periodically.

23. The method of claim 22, further comprising time stamping each time the attempting, testing and ranking steps are performed.

24. The method of claim 23, wherein if an attempt is made to place the call within a predetermined time of the latest ranking step, placing the call over the network which ranks above the other networks.

25. The method of claim 16, further comprising attempting to place the call over each detected network in a round robin fashion and monitoring the call to determine if the physical location was received by the emergency services call center.

26. The method of claim 16, wherein at least one of the networks is the same as one of the LDT's.

27. The method of claim 16, further comprising assigning pre-determined reliability factors to at least some of the networks, testing each detected network, and ranking the detected networks based on the results of the tests and the reliability factors.

* * * * *